Patented Mar. 8, 1938

2,110,206

UNITED STATES PATENT OFFICE 2,110,206

PROCESS OF MAKING EXTRACT OF CASCARA SAGRADA OR THE LIKE

Edward D. Davy, Cleveland Heights, Ohio

No Drawing. Application November 19, 1935, Serial No. 50,546. Renewed March 27, 1937

8 Claims. (Cl. 87—28)

This invention relates to the debitterization of the drug from *Rhamnus purshiana* (cascara sagrada), or other species of the genus Rhamnus.

An object of the invention is to debitterize the products extracted from *Rhamnus purshiana* or other species of the genus Rhamnus or to debitterize suspensions of the drug in water.

Another object of the invention is to provide a simple and efficient process for debitterizing such drugs, and particularly the products of cascara sagrada, and to retain the cathartic properties thereof.

A further object of the invention is to provide a debitterized extract of cascara sagrada in which its cathartic activity is not substantially impaired and to provide an extract which does not have the effect of causing a griping action when used physiologically.

These and other objects of the invention will be readily apparent to those skilled in the art from the description herein.

According to my process it is possible to completely debitterize the products of cascara sagrada without substantially impairing their cathartic activity.

In carrying out my process it will be described in connection with cascara sagrada, which is the most important one of the species above referred to. The dry cascara bark, preferably in the form of a coarse powder, is treated with water, preferably hot or boiling water, in the ratio of about 1 part of the bark to about 5 parts of the water, and macerated two or more hours in a suitable receptacle, such as a percolator.

When the maceration is complete the percolation is started and continued until the drug is exhausted. The percolate is reduced in volume by evaporation, or in any other suitable manner, until the volume of the percolate contains the equivalent of approximately 1 gram of drug in 0.7 c. c. of liquid extract.

To the concentrated percolate is added magnesium oxide, calcium oxide, or hydroxides of the same, or a mixture of the oxides or hydroxides, in an amount approximating 100 grams to each liter of the finished product. Also, 1 to 2 grams of sodium or potassium hydroxide is added to each liter of the finished product. The different oxides or hydroxides may be added in any desired order.

The sodium or potassium hydroxide is added with the magnesium or calcium compounds to keep the active cathartic principle in solution or aid in dissolving the same in the event the magnesium or calcium compound is added prior to the addition of sodium or potassium hydroxide.

When the magnesium or calcium compound is added in the absence of sodium or potassium hydroxide, or without the subsequent addition of sodium or potassium hydroxide, there is a tendency for a portion of the active cathartic principle to be precipitated together with resinous material.

The treatment of the liquid extractive with magnesium or calcium oxides or hydroxides tends to reduce the bitterness, but does not completely debitterize the product without oxidation in some suitable manner. While oxidation may be carried out by various means, aeration is a very convenient method, which, when carried on for several hours, and particularly in the presence of heat, produces a substantially debitterized product. It may also be noted that aging of the product has a tendency to aid in the debitterization thereof.

To the debitterized product may be added alcohol or other preservatives, and the product may be flavored with any suitable flavoring material and sweetening agent, if desired, and sufficient water is added to make the correct volume. The product is then preferably clarified, either by sedimentation or filtration, or both.

In the event a pilular or powdered extract is desired, the debitterized extract is further concentrated by distillation or evaporation to the desired degree.

While it is preferable to debitterize the products of cascara sagrada as previously described, it is to be understood that the alkaline earth oxides or hydroxides may be present with the sodium or potassium hydroxide in the water during maceration and percolation of the bark.

In the above description calcium oxide, magnesium oxide, or hydroxides of the same, and also sodium or potassium hydroxides, have been referred to. It is to be understood that the use of the term "hydroxides" in connection with these compounds is intended to refer to such calcium, magnesium, sodium or potassium compounds as will yield a hydroxide in the presence of water. Also in the specification certain compounds have been specified as "alkaline earth compounds", which term is intended to include calcium compounds, magnesium compounds or other compounds of this group not otherwise objectionable from the physiological point of view.

This application is a continuation-in-part of my application Serial No. 755,589, filed December 1, 1934.

Furthermore, it is to be understood that the particular compounds disclosed, and the procedure set forth, are presented for purposes of explanation and illustration, and that various equivalents can be used and modifications of said procedure can be made without departing from my invention as defined in the appended claims.

What I claim is:

1. The process of making a debitterized extract of cascara sagrada or the like, which comprises preparing a liquid extractive of the bark by carrying out, in optional succession, the steps of preparing an aqueous percolate and of treating the bark with an alkaline earth hydroxide and an alkali metal hydroxide in the presence of water, and subsequently oxidizing the extractive.

2. The process of making a debitterized extract of cascara sagrada or the like, which comprises preparing a percolate of the bark by treating said bark, in optional succession, with water, magnesium hydroxide, and sodium hydroxide, and subsequently oxidizing the percolate.

3. The process of making a debitterized extract of cascara sagrada or the like, which comprises making an aqueous extractive of the bark with an alkaline earth hydroxide and an alkali metal hydroxide.

4. In the process of making a debitterized extract of cascara sagrada or the like, the steps of forming a liquid extractive by percolating the bark with water, adding an alkaline earth hydroxide and an alkali metal hydroxide to the liquid extractive, and oxidizing the extractive.

5. The process of making a debitterized extract of cascara sagrada or the like, which comprises forming an aqueous percolate from the bark, adding magnesium and sodium hydroxides to the percolate, and oxidizing the product.

6. In the process of making a debitterized extract of cascara sagrada or the like, the steps of percolating the bark with water to form a liquid extractive, concentrating the percolate, adding magnesium hydroxide and sodium hydroxide to the liquid extractive, and aerating the extractive until the product is substantially debitterized.

7. The process of making an extract of cascara sagrada or the like, which comprises preparing a liquid extractive by treating the bark with water in the presence of both an alkali earth hydroxide and an alkali metal hydroxide, and oxidizing the liquid extractive.

8. The process of making an extract of cascara sagrada or the like, which comprises preparing a liquid extractive by treating the bark with water in the presence of both magnesium hydroxide and sodium hydroxide, concentrating the liquid extractive, and aerating the same until the product is substantially debitterized.

EDWARD D. DAVY.